United States Patent [19]

Walters et al.

[11] 4,281,044

[45] Jul. 28, 1981

[54] ADHESION OF PHENOLICS TO COPPER

[75] Inventors: Linwood A. Walters, Storrs; J. Mark Mersereau, Brooklyn, both of Conn.

[73] Assignee: Rogers Corporation, Rogers, Conn.

[21] Appl. No.: 53,533

[22] Filed: Jun. 29, 1979

Related U.S. Application Data

[63] Continuation-in-part of Ser. No. 844,293, Oct. 21, 1977, abandoned, and a continuation-in-part of Ser. No. 844,297, Oct. 21, 1977, abandoned.

[51] Int. Cl.$^3$ .......................... B32B 15/08; B32B27/42
[52] U.S. Cl. ........................... 428/460; 260/45.7 SE; 525/505; 528/158
[58] Field of Search .................. 428/460; 525/505; 528/158; 260/45.7 SE

[56] References Cited

U.S. PATENT DOCUMENTS

| | | | |
|---|---|---|---|
| 1,927,929 | 9/1933 | Ellis | 528/212 |
| 1,927,930 | 9/1933 | Ellis | 525/534 |
| 1,931,309 | 10/1933 | Thompson | 428/460 |
| 2,360,645 | 10/1944 | Bruce et al. | 528/133 X |
| 2,505,782 | 5/1950 | Meiler et al. | 260/17.2 |
| 2,847,712 | 8/1958 | Pollard et al. | 264/259 |
| 2,920,990 | 1/1960 | Been et al. | 428/460 X |
| 3,066,060 | 11/1962 | Gross | 428/460 |
| 3,455,851 | 7/1969 | Meredith et al. | 260/3 |
| 3,915,664 | 10/1975 | Busch et al. | 428/460 X |
| 4,163,030 | 7/1979 | Banucci et al. | 428/460 X |

OTHER PUBLICATIONS

Kirk-Othmer, Encycl. of Chem. Technology, vol. 2, 1964, pp. 745–746.
Phenoplasts, Carswell, p. 95, 1947.

*Primary Examiner*—Howard E. Schain
*Attorney, Agent, or Firm*—Fishman and Van Kirk

[57] ABSTRACT

The bonding of phenolic resins and phenolic molding materials to copper is significantly improved by the addition to the phenolic material of elemental sulfur in a weight percentage from 0.005% to 1%, the weight percentage of sulfur being preferably from 0.01% to 0.2%.

9 Claims, 1 Drawing Figure

ADHESION OF PHENOLICS TO COPPER

CROSS-REFERENCE TO RELATED APPLICATION

This application is a continuation-in-part of application Ser. No. 844,293, filed Oct. 21, 1977 and application Ser. No. 844,297, filed Oct. 21, 1977, both now abandoned.

BACKGROUND OF THE INVENTION

This invention relates to the field of heat curable phenolic resin molding materials and especially to novolak resins. More particularly, this invention relates to the field of thermosetting phenolic resin molding material, and products made therefrom, which are, or are intended to be, adhered to copper.

Phenolic resin molding materials are widely used in electrical and electronic applications. In many such applications, copper elements, such as connectors and commutators, are often molded into elements formed from phenolic molding material. These copper elements are very often held in place primarily, if not entirely, by mechanical bonds, i.e. by the physical hooking or inter-engagement of mutually rough areas of the copper and the phenolic to each other. Such mechanical bonds are known to be relatively weak, and separation or delamination of the copper elements from the molded phenolic elements is a recognized problem.

SUMMARY OF THE INVENTION

In accordance with the present invention, sulfur in the range of from 0.005% to 1.0% (by weight), and preferably in the range of from 0.01% to 0.2% is added to the thermosetting phenolic molding material, especially a novolak resin, from which molded elements are to be formed. When molded parts with copper elements are formed from such sulfurized molding materials, significantly greater bonding or adhesion of the copper elements to the molding material is achieved unexpectedly.

DESCRIPTION OF THE PREFERRED EMBODIMENT

Figure 1:
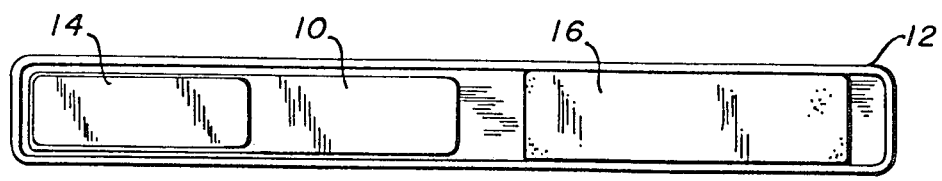
FIG. 1 is a top plan view of a mold used to form test elements to test and demonstrate the present invention.

In accordance with the present invention, phenolic molding materials are prepared having from 0.005% to 1.0% (by weight) of sulfur, and preferably from 0.01% to 0.2% sulfur. Such phenolic molding materials, when cured and formed into molded parts having copper elements in or on the surface thereof, have unexpectedly been found to have significantly improved adhesion of the copper to the phenolic than would be realized with such molding materials without the sulfur. The unexpectedly improved bonding of copper to phenolic which is achieved with the present invention is of considerable importance for molded parts, such as electrical connectors and commutators which are subjected to significant physical stressing in operation. For example, commutators are subjected to significant physical forces during operation, and these forces can result in separation or delamination of copper elements on the commutator surfaces if the copper elements are not adequately bonded to the body of the commutator. Since it is desirable to form the body of the commutator out of phenolic molding materials, it is most important to achieve a reliable bond of the copper elements to the phenolic. Thus, although certainly not limited to such applications, the phenolic molding materials of the present invention are particularly suitable for use in forming commutators having bodies of phenolic molding material having copper conducting elements molded in or on the surface of the commutators.

The significant improvements in the bonding of phenolic to copper which are achieved with the present invention will be illustrated in the examples set forth hereinafter. While the reason for the improved bonding is not fully understood, one theory is that the sulfur consists of $S_8$ rings or long chains, with one end of the sulfur chains linking with the phenolic resin and the other end of the sulfur chains bonding to the copper by reacting chemically with the copper to form a layer of copper sulfide. However, it is not certain that this theory is correct, and the invention is not limited to that theory. Because of possible variations in processing and preparation of samples from time to time, the test results discussed below should only be compared within each test group, but not between test groups. In addition, it will be noted that the test results listed for various examples are averages for several bars of each formulation.

TEST GROUP I: EXAMPLES 1 THROUGH 6

A control phenolic molding material and six test samples of phenolic molding materials were formed in accordance with the formulations set forth in Table 1. In all cases, lab kneader batches of flake material were made, and the material was then formed into molding material preforms in accordance with procedures known in the art. In Examples 1 through 6, powdered sulfur was added to the resin and thoroughly blended with the resin before the resin was charged into the kneader.

TABLE 1

|  | Control | Example 1 0.005%S | Example 2 0.01%S | Example 3 0.05%S | Example 4 0.2%S | Example 5 0.6%S | Example 6 5.0%S |
| --- | --- | --- | --- | --- | --- | --- | --- |
| Asbestos fibers (long and floats) | 1125 | 1125 | 1125 | 1125 | 1125 | 1125 | 1125 |
| Super White Clay | 225 | 225 | 225 | 225 | 225 | 225 | 225 |
| Lime | 25 | 25 | 25 | 25 | 25 | 25 | 25 |
| Stearic Acid | 27.5 | 27.5 | 27.5 | 27.5 | 27.5 | 27.5 | 27.5 |
| Calcium Stearate | 50 | 50 | 50 | 50 | 50 | 50 | 50 |

TABLE 1-continued

|  | Control | Example 1 0.005%S | Example 2 0.01%S | Example 3 0.05%S | Example 4 0.2%S | Example 5 0.6%S | Example 6 5.0%S |
|---|---|---|---|---|---|---|---|
| Novolak resin with hexa curing agent | 1012.5 | 1012.5 | 1012.5 | 1012.5 | 1012.5 | 1012.5 | 1012.5 |
| Water (hot) | 190 | 190 | 190 | 190 | 190 | 190 | 190 |
| Sulfur (powder) | — | 0.0125 | .25 | 1.3 | 5 | 15 | 125 |
| Water | 248 | 248 | 248 | 248 | 248 | 248 | 248 |

In the Examples set forth in TABLE 1, and also in the case of the Examples of TABLE 3 below, the numerical values are in parts by weight and the clay functions in the molding compound as a filler, the lime functions as a catalyst, the stearic acid functions as a low temperature lubricant and the calcium stearate functions as a high temperature lubricant. The hot water is a processing aid which facilitates adhesion between constituants and particularly between the fibers and other constituants. The additional water is included to cause the molding material to break up into flakes or nodules. The sulfur, as previously noted, is elemental sulfur. The particular resin was novolak 86.85.19 obtained from La Bakelite of Bejons, France. This particular novolak is said by the manufacturer to comprise, by weight, 85 parts novolak resin to 15 parts hexa curing agent (hexamethylene tetramine). The La Bakelite 86.85.19 shows 44.5 to 51.0 mm plate flow at 125° C. in a standard viscosity and cure rate test. As is well known, a novolak is a phenolic resin which is the reaction product of phenol and formaldehyde with less than 1 mol of formaldehyde per mol of phenol. A novolak is made with an acid catalyst and requires a curing agent to cross-link. A novolak is characterized by good shelf life; i.e., novolaks do not cure "on the shelf". All novolaks are suitable for use in the practice of the present invention.

Figure 2:
FIG. 2 is a side elevation view of a test element formed from the mold of FIG. 1.

Molding preforms were formed from the formulations of the control of Table 1 and each of Examples 1 through 6. These preforms, which weighed about 6 to 7 grams each, were formed in a die at approximately 19,000 psi to form generally disc shaped elements. These preforms were then used to form test bars having a molded body of thermosetting phenolic molding material with a copper strip adhered to one surface of the bar. With reference to FIGS. 1 and 2, the procedure for forming the test bars is as follows:

(1) 0.025 inch thick copper is cut into strips 10 which are 2.5 inches long and 0.5 inches wide.

(2) The strips were cleaned by scouring with #00 steel wool, soaked for ten minutes in trichloroethane, air dried, soaked for ten seconds in 5% HCl, soaked in distilled water for fifteen seconds, and then wiped dry. The cleaned strips are thereafter handled with tweezers or cotton gloves.

(3) A copper strip 10 is then placed in a compression bar mold 12 which is approximately 5 inches long and approximately ½ inch wide.

(4) A stainless steel insert approximately 1.5 inches long, 0.496 inches wide and 0.124 inches thick is then placed in mold 12 on top of copper strip 10 so that insert 14 covers the leftmost end of the copper strip and leaves the right half of the copper strip exposed.

(5) A molding material preform 16 which has been preheated to 240° F. in about 15 to 30 seconds is then placed in mold 12 at the opposite end of the mold from insert 14.

(6) A pressing bar then presses the preform at 6,000 psi and 340° F. for two minutes, whereby the preform is caused to flow and cover the copper strip up to the stainless steel insert.

(7) When the molding cycle is completed, the molded bar is then removed from the mold, and the stainless steel insert is removed from the bar to leave the configuration shown in FIG. 2 with a portion 10a of the copper strip bonded to the bottom of the bar and a portion 10b of the strip extending beyond the end of bar 18. Portion 10b forms a gripping tab to which force can be applied to try to pull the copper strip from the bar to measure the adhesion strength between the copper strip and the bar.

Bars with copper strips adhered thereto (with the bars being formed from the compositions of the control and the compositions of Examples 1 through 6) were then subjected to a test, in tension, to determine adhesion strength. That test involved clamping upper portion 10b and the opposite end of bar 18 in the opposite jaws of an Instron tester and operating the tester in the tensile mode until either the copper separated from the bar or the bar broke.

Referring now to Table 2, the adhesion strength, expressed in pounds per square inch, is shown for the control of Table 1 and each of the Examples 1 through 6. The results listed in Table 2 clearly show that a marked improvement in copper adhesion strength is realized by even the addition of as small an amount as 0.005% by weight of copper to the composition of a phenolic molding material. The data of Table 2 also show that the beneficial results of sulfur addition are lost if an excessive amount of sulfur is added to the molding material composition; and, while the maximum useful addition of sulfur is approximately 5.0% by weight of the phenolic molding material composition, the practical limit is 1.0%. Table 2 also clearly shows that the maximum beneficial results of sulfur addition are achieved with addition of sulfur in the range of from 0.01% to 0.2%, by weight, of sulfur to the phenolic molding material composition. These results set forth in Table 2 are quite startling and unexpected.

TABLE 2

|  | % Sulfur | Copper Adhesion Strength (PSC) |
|---|---|---|
| Control |  | 36 |
| Example 1 | 0.005% | 168 |
| Example 2 | 0.01% | 328 |
| Example 3 | 0.05% | 364 |
| Example 4 | 0.2% | 360 |
| Example 5 | 0.6% | 122 |
| Example 6 | 5.0% | 84 |

TEST GROUP II: EXAMPLES 7 AND 8

Additional testing was conducted with a control which was a repeat of the control of Test Group I and two additional samples, Examples 7 and 8. Both Examples 7 and 8 contained 0.2% (by weight) of sulfur. The sulfur of Example 7 was in the form of water based dispersion, while the sulfur in Example 8 was in the form of a sublimed powder. One purpose of running Examples 7 and 8 was to see if there was any significant difference in copper adhesion using dispersed versus powdered sulfur. No significant difference was noted.

Examples 7 and 8 and the control of Test Group II were also used to determine whether surface treatments of the copper affected adhesion strengths. To this end, one half of the copper strips for each example and the control were scoured, i.e. polished with #00 steel wool, and the rest were scoured and dipped in diluted HCl to slightly etch the surface of the copper. For the "scoured only" strips, step 2 of the above described procedure for forming test bars was as follows:

The strips were soaked in trichlorethane for 10 minutes, air dried, scoured with #00 steel wool, and wiped with paper towel. For the "scoured and etched" strips, step 2 of the bar forming procedure was as follows:

The strips were soaked in trichlorethane for 10 minutes, air dried, scoured with #00 steel wool, soaked in 5% HCl for 10 seconds, rinsed in distilled water, and air dried.

Table 3 shows the formulation for the control and Examples 7 and 8 of Test Group II.

TABLE 3

|  | Control | Example 7 | Example 8 |
|---|---|---|---|
| Asbestos fibers (long and floats) | 1125 | 1125 | 1125 |
| Super White Clay | 225 | 225 | 225 |
| Lime | 25 | 25 | 25 |
| Stearic Acid | 27.5 | 27.5 | 27.5 |
| Calcium Stearate | 50 | 50 | 50 |
| Novolak resin with hexa curing agent | 1012.5 | 1012.5 | 1012.5 |
| Water (hot) | 190 | 187.6 | 190 |
| Water | 248 | 248 | 248 |
| Sulfur dispersion (wet/dry) |  | 7.4/5 |  |
| Powdered sulfur |  |  | 5 |

Table 4 shows the variations in adhesion strength between samples in which the copper strips were only scoured versus those in which copper strips were both scoured and etched. A definite improvement is noted for the samples that are scoured and etched. This table also confirms the results of Examples 1-6 in that improved adhesion is obtained by the addition of sulfur, regardless of whether the copper strips are etched.

TABLE 4

|  | Copper Adhesion Strength (PSC) | |
|---|---|---|
|  | Scour Only | Scour and etch |
| Control | delaminated | 118 |
| Example 7 | 172 | 310 |
| Example 8 | 162 | 226 |

In addition to the foregoing, substantial additional testing has been done which confirms the results reported and discussed herein. This additional testing has been conducted with phenolic molding materials having different compositions (including different reinforcing fibers than asbestos) than the controls and examples discussed herein, thus establishing that the unexpected improved results in copper adhesion resulting from the addition of sulfur are not limited to the specific phenolic molding material formulations discussed herein.

While preferred embodiments have been shown and described various modifications and substitutions may be made thereto without departing from the spirit and scope of the invention. Accordingly, it will be understood that the present invention has been described by way of illustration and not limitation.

What is claimed is:

1. An article of manufacture comprising:
   molded body means, said molded body means being formed from a material consisting essentially of a thermosetting phenolic resin molding compound and 0.005 to 1.0 weight percent sulfur in elemental form; and
   a copper element in contact with and directly adhered to said molded body means.

2. The article of claim 1 wherein said molding compound comprises 0.01 to 0.2 weight percent sulfur.

3. The article of claim 2 wherein said molding compound further includes reinforcing fibers.

4. An article of manufacture comprising:
   molded body means, said molded body means being formed from a material consisting essentially of a thermosetting phenolic resin molding compound having a novolak resin with a curing agent and 0.005 to 1.0 weight percent elemental sulfur; and
   a copper element in contact with and directly adhered to said molded body means.

5. The article of claim 4 wherein said molding compound curing agent is hexamethylene tetramine.

6. The article of claim 4 wherein said molding compound comprises from 0.01 to 0.2 weight percent elemental sulfur.

7. An article of manufacture comprising:
   molded body means, said molded body means being formed from a thermosetting phenolic resin molding compound having from 0.01 to 0.02 weight percent elemental sulfur; and
   a copper element in contact with and directly bonded to said molded body means.

8. The article of claim 7 wherein said molding compound further includes reinforcing fibers.

9. The article of claim 7 wherein said molding compound includes a novolak resin with a curing agent.

* * * * *

UNITED STATES PATENT AND TRADEMARK OFFICE
CERTIFICATE OF CORRECTION

PATENT NO. : 4,281,044
DATED : July 28, 1981
INVENTOR(S) : L. A. Walters et al

It is certified that error appears in the above-identified patent and that said Letters Patent are hereby corrected as shown below:

Claim 7, line 4, (column 6, line 54) change "0.02" to --0.20--

Signed and Sealed this

First Day of December 1981

[SEAL]

Attest:

Attesting Officer

GERALD J. MOSSINGHOFF

Commissioner of Patents and Trademarks